May 11, 1943.  H. A. CONGDON  2,318,675
STRAWBERRY RUNNER CUTTER
Filed Dec. 17, 1940
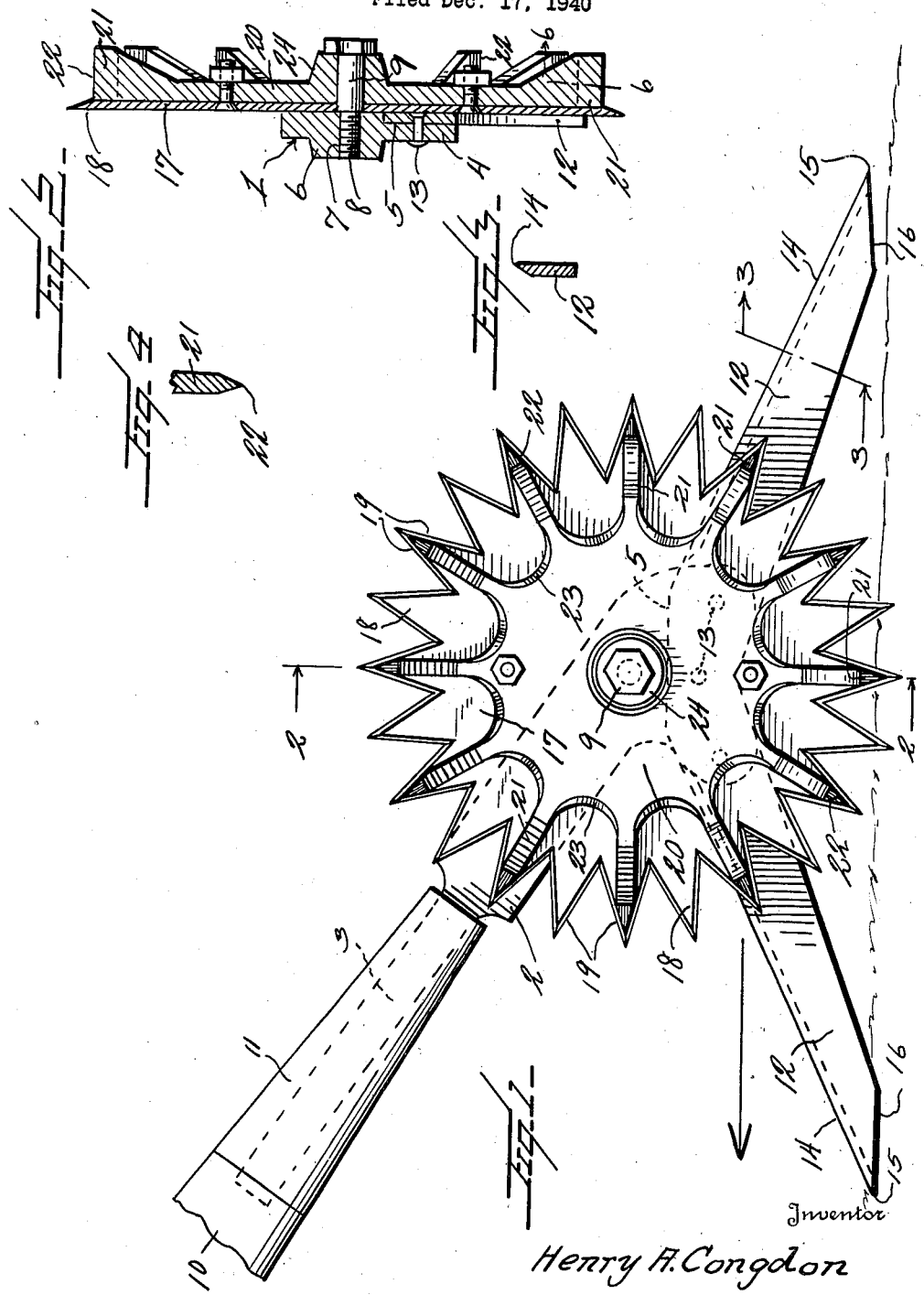
Inventor
Henry A. Congdon
By Watson E. Coleman
Attorney Patented May 11, 1943

2,318,675

UNITED STATES PATENT OFFICE 2,318,675

STRAWBERRY RUNNER CUTTER

Henry A. Congdon, Kingston, R. I.

Application December 17, 1940, Serial No. 370,551

8 Claims. (Cl. 55—64)

This invention relates generally to the class of agricultural implements and pertains particularly to improvements in hand-operated vine cutting devices and more especially a device for cutting the runners of strawberry plants.

The present invention has for its primary object to provide a runner cutter for strawberry plants or similar plants, which is designed to be operated by hand and which is constructed so as to be of light weight whereby its ready handling or manipulation is facilitated, while at the same time being of sturdy construction so as to function efficiently and with a minimum of effort on the part of the operator.

Another object of the invention is to provide a strawberry runner cutter employing a handle carried fixed blade together with a rotary cutting blade which cooperates with the fixed blade for shearing the runners, and means carried by the rotary blade for facilitating the turning of the same and its effective operation in association with the fixed blade.

A further object of the invention is to provide a strawberry runner cutter employing a rotating cutting blade, which has associated with the rotating blade ground engaging lugs which provide a positive traction for effecting the rotation of the rotary blade, such lugs being so designed, spaced and arranged, that they will function at all times in any type of soil without becoming clogged or rendered ineffective by the adherence of the soil thereto.

Still another object is to provide a strawberry runner cutting device having a pair of obtusely angled fixed cutting blades with a rotary cutting blade mounted relatively thereto whereby the device may be pushed ahead of the operator or drawn toward the operator for the actuation of the rotary blade and the cutting of the runners, thereby greatly increasing the efficiency of the device over other types of cutters which are designed for a like purpose.

A still further object is to provide a strawberry runner cutter which is so designed that it may be readily moved or worked longitudinally of rows of strawberry plants or transversely of the rows, and which does not depend for its cutting action upon the pressing of the cutting blade down against the runner and against the underlying ground but which operates to engage or catch the runner between a cutting edge of a fixed blade and a cutting edge of a moving blade whereby a positive and clean cutting of the runner is effected.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the runner cutter constructed in accordance with the present invention.

Fig. 2 is a vertical section on the line 2—2 of Fig. 1.

Fig. 3 is a sectional view on the line 3—3 of Fig. 1.

Fig. 4 is a sectional view on the line 6—6 of Fig. 2.

Referring now more particularly to the drawing, the numeral 1 designates generally the frame of the present runner cutter, which comprises a short flat bar 2 having at one end a tine 3 while at its other end it is shaped to provide a relatively wide obliquely directed head 4 which is provided on one side with a transverse recess 5.

Above the recessed portion and at the back of the head, the frame is thickened to form a hub 6 and through the center of this hub and the corresponding part of the frame, a threaded passage 7 is formed for the reception of the reduced threaded end portion 8 of a pivot bolt 9.

The numeral 10 designates a handle into the lower end of which the tine 3 of the frame extends, the handle being reinforced at such end by the usual encasing ferrule 11.

The numeral 12 designates two cutting blades which will be referred to as fixed blades since they do not move with respect to the frame, and these blades are relatively long and are joined together to form a unitary structure and to have an obtusely angled relation. The blades 12 at their joined ends fit across the head portion 4 of the frame and into the recess 5 where they are secured by rivets 13 or in any other suitable manner. When so fixed to the head, one of the blades extends forwardly substantially in alinement with the handle 10, while the other blade extends in the opposite direction or rearwardly and forms an acute angle with the handle and the part 2 of the frame. The top edges of the blades are sharpened, as indicated at 14, and each blade at its outer end is cut obliquely to the edge 14, thus providing the ground penetrating point 15 and a sole 16, which may rest upon the surface of the ground or slide through the ground just below the surface as the rearwardly directed or left-hand blade 12 is shown in Fig. 1. This is the position which the free end of the blade assumes with respect to the ground when the implement is drawn in the direction indicated by the arrow. When the implement is pushed forwardly, then the forward blade will penetrate the ground and the rear blade will ride over the surface or move just above the surface.

The numeral 17 designates a thin plate or disk-like body which is provided at its periphery with the plurality of pointed or saw-like teeth 18, each of which is sharpened on each of its edges, as indicated at 19. The disk 17 thus constitutes a rotary cutting blade having a plurality of teeth and is mounted upon the pivot 9 for rotation.

Secured to the outer face of the disk 17 is a plate or casting 20 which has a plurality of radial arms 21, each of which gradually increases in width toward its outer edge to form a ground engaging lug or traction lug 21. The radially directed edge of each lug is sharpened, as indicated at 22, so as to bite into the ground and these sharpened edges of the lugs terminate at the point of mergence of the beveled or sharpened edges 19 of the adjacent disk tooth 18 along the center of which the arm lies.

In Fig. 1, the traction lug arms have been illustrated as spaced with respect to the teeth 18, so that alternate teeth are engaged by an arm and each arm extends along the longitudinal center of a tooth but it is, of course, to be understood that this ratio of arms to teeth as here shown is not required for the proper operation of the implement since the arms may be given such other arrangements with respect to the teeth as may be found desirable. The ratio between the lugs and the teeth will be determined by the conditions of design, particularly the diameter of the disk which has the rotating or cutting blades.

In the crotch between the traction lug arms, the plate 20 is beveled, as indicated at 23. By this arrangement the packing of earth between the arms is prevented, thus when the device is operated in soft ground, it will not become ineffective by the earth piling up and packing in between the arms since the relatively great width between the arms and the beveling of the plate body at the crotch between each pair of arms will cause the earth to pass on through rather than to pack between the arms.

The central part of the lug plate is enlarged, as indicated at 24, to form a hub having a central passage for the pivot bolt 9, and thus it will be seen that the plate and disk rotate as a unit on the pivot bolt, and by reason of this hub formation on the plate, a substantial bearing area is provided which will cause the unit to rotate properly. It will also be apparent upon reference to Fig. 2, that by recessing the outer side or face of the head of the frame, the fixed blades are set so that their outer faces are flush with the outer face of the head of the frame and, therefore, the back face of the toothed disk 17 will lie flatly against the blades and the cutting edges 19 of the teeth will move in the proper proximity to the cutting edges 14 of the blades to effect a clean cutting of a runner.

From the foregoing, it will be readily apparent that the implement herein disclosed may be strongly but lightly constructed and that it can be conveniently used at the sides of rows of strawberry plants or transversely of the rows between the plants and may also be moved forwardly or backwardly according to the convenience of the operator without stopping its cutting action. It will also be readily apparent that as the device is moved forwardly or backwardly, the runners will be lifted from the ground on the edges of the inclined blades 12 until they enter between a pair of teeth 18, whereupon they will be cleanly cut or sheared off. As previously stated, when the implement is in use, the blade 12 which extends in the direction in which the implement is moved will have its sole 16 slightly below the surface of the ground while the sole of the other blade will be above or on the ground surface. In this manner the pointed advancing end of the blade will easily pass under the runners lying on the ground and move them into proper cutting position.

It is preferred that in the implement when constructed in accordance with the present invention, the length of the cutting or shearing edge of each of the cutting teeth 18 shall equal or exceed the distance between the points of the teeth. This design prevents the plant runner from being dragged forward by that portion of the disk where the cutting edges intersect before the runners have been subjected to the shearing action of the fixed blade and an edge of a tooth of the rotary blade.

It will, of course, be understood that when the device is in operation, the points of the teeth of the rotary blade will penetrate the ground as will also the edges 22 of the traction lugs and thus positive rotary movement will be continuously imparted to the rotary blade, so that the cutting action of the implement will be effective at all times.

What is claimed is:

1. A cutting device of the character described, comprising a frame, a handle attached to the frame, a cutting blade fixed to the frame and adapted, in the use of the implement, to have an inclined relation to the surface of the ground with its cutting edge directed upwardly, a cutting disk rotatably mounted upon the frame at one side of the blade and having radially directed pointed cutting teeth the side edges of which cooperate with the cutting edge of the blade, and ground penetrating traction means disposed at a side of the cutting disk in the circular area of the disk between the points of the teeth and the gullets thereof for engagement with the earth to impart rotary movement to the cutting blade when the implement is moved over the ground.

2. A runner cutter, comprising a frame body having a handle, a relatively long blade having a cutting edge and secured at one end to the frame with the cutting edge directed upwardly, said blade being extended downwardly from the frame at an inclination to the surface of the ground when the handle and frame are in working position, a disk rotatably mounted upon the frame at one side of said blade, said disk having peripheral radially directed pointed cutting teeth cooperating with the edge of the blade for the cutting of runners, and a plurality of ground engaging traction lugs disposed upon the outer side of the disk adjacent certain of the teeth thereof, and each terminating short of the point of the adjacent tooth but sufficiently close to such point to penetrate the earth with the tooth point.

3. A runner cutter, comprising a frame body having a handle, a relatively long blade having a cutting edge and secured at one end to the frame with the cutting edge directed upwardly, said blade being disposed at an inclination to the surface of the ground when the handle and frame are in working position, a disk rotatably mounted upon the frame at one side of said blade, said disk having peripheral pointed cutting teeth arranged to move across the edge of the blade for the cutting of runners, and a plurality of ground engaging traction lugs secured against the outer face of the disk to extend radially thereof, each lug being disposed upon the longitudinal center of a tooth and each lug having a relatively long ground engaging edge extending axially from the adjacent face of the disk and terminating between the point and the base of the tooth.

4. A runner cutter, comprising a frame in the form of an elongated flat plate having one side face recessed at one end, a handle connected to the other end of the frame, a relatively long rigid cutting blade having an end secured in said recess whereby a face of the blade is in the plane with the outer face of the frame plate, a pivot member carried by the frame plate above said recess, a disk rotatably supported upon the pivot member to have one face turn against and across the said face of the blade, said disk having peripheral radially directed pointed cutting teeth for movement across an edge of the blade, and ground engaging traction members carried by the disk upon the side thereof opposite from the blade, and having a laterally extending ground engaging edge disposed only slightly inwardly of the point of the adjacent tooth.

5. A runner cutter, comprising a frame in the form of an elongated flat plate having one side face recessed at one end, a handle connected to the other end of the frame, a relatively long rigid cutting blade having an end secured in said recess whereby a face of the blade is in the plane with the outer face of the frame plate, a pivot member carried by the frame plate above said recess, a disk rotatably supported upon the pivot member to have one face turn against and across the said face of the blade, said disk having peripheral cutting teeth for movement across an edge of the blade, a plate secured to the disk upon the outer side thereof away from said blade and having a plurality of radially extending arms, each of said arms extending longitudinally of the center of a cutting tooth and each of said arms terminating in a relatively wide ground engaging portion constituting a traction lug.

6. A runner cutter, comprising a frame in the form of an elongated flat plate having one side face recessed at one end, a handle connected to the other end of the frame, a relatively long rigid cutting blade having an end secured in said recess whereby a face of the blade is in the plane with the outer face of the frame plate, a pivot member carried by the frame plate above said recess, a disk rotatably supported upon the pivot member to have one face turn against and across the said face of the blade, said disk having peripheral cutting teeth for movement across an edge of the blade, a plate secured to the disk upon the outer side thereof away from said blade and having a plurality of radially extending arms, each of said arms extending longitudinally of the center of a cutting tooth and each of said arms terminating in a relatively wide ground engaging portion constituting a traction lug, said plate in the crotch between the arms being beveled to form a sloping surface across which earth may pass to prevent packing.

7. A runner cutter, comprising a frame consisting of an elongated flat plate having a recess formed across one end thereof, a handle connected with the other end of the plate, a pair of relatively long cutting blades secured in said recess to extend in opposite directions from the plate in an obtusely angled relation and to extend from the plate downwardly toward their free ends, the top edges of the blades being sharpened, a pivot member carried by the plate in perpendicular relation to the plane of the blades and midway between the free ends of the blades, said blades having their outer faces flush with the outer face of the frame plate, a disk rotatably supported upon the pivot and having peripheral cutting teeth, each tooth having outwardly convergent cutting edges, said disk being maintained with one side in close relation to the outer faces of the blades whereby the cutting edges of the teeth cooperate with the blade edges, and earth engaging traction lugs carried by the disk adjacent the points of the teeth and upon the side of the disk opposite from the cutting blades.

8. A runner cutter, comprising a frame consisting of an elongated flat plate having a recess formed across one end thereof, a handle connected with the other end of the plate, a pair of relatively long cutting blades secured in said recess to extend in opposite directions from the plate in an obtusely angled relation and to extend from the plate downwardly toward their free ends, the top edges of the blades being sharpened, a pivot member carried by the plate in perpendicular relation to the plane of the blades and midway between the free ends of the blades, said blades having their outer faces flush with the outer face of the frame plate, a disk rotatably supported upon the pivot and having peripheral cutting teeth, each tooth having outwardly convergent cutting edges, said disk being maintained with one side in close relation to the outer faces of the blades whereby the cutting edges of the teeth cooperate with the blade edges, and a plate secured against the outer side of the disk having a plurality of radial arms, each arm extending along the center of a tooth and terminating adjacent the point of the tooth, the terminal end of each arm being relatively wide to form a ground engaging traction lug.

HENRY A. CONGDON.